United States Patent Office 3,376,282
Patented Apr. 2, 1968

3,376,282
POLYMERIC DERIVATIVES OF CATIONIC
XANTHOMONAS COLLOID DERIVATIVES
Richard G. Schweiger, San Diego, Calif., assignor to Kelco Company, San Diego, Calif., a corporation of Delaware
No Drawing. Filed Jan. 8, 1964, Ser. No. 336,364
6 Claims. (Cl. 260—209.6)

This invention relates to novel polymeric complexes giving high viscosities in aqueous solutions, and more particularly to complexes obtained from cationic Xanthomonas colloid derivatives.

It has long been known that hydrophilic colloids of opposite electric charge, when brought together in the same solution or dispersion, react with each other by way of mutual neutralization. Since the stability of hydrophilic colloids possessing an inherent charge is at least in part dependent upon that charge, the mutual interaction of oppositely charged types as has just been described classically leads to coagulation. Indeed, many standard demonstration experiments in colloid chemistry are based upon this phenomenon. The procedure even finds industrial application, in various clarifying processes, because of the quite generally coagulated and inert characteristics of the resulting product of the mutual neutralization.

An object of the present invention is to provide a complex formed from two polymers of opposite signs by mutual neutralization which is not inert, but on the contrary exhibits useful properties of swelling and dispersing in water to give solutions of abnormally high viscosity.

Another object of the invention is to provide useful derivatives from Xanthomonas colloid which has been converted to a cationic form.

Further objects of the invention will appear as the description thereof proceeds.

Generally speaking and in accordance with illustrative embodiments of my invention, I bring together in aqueous suspension or solution or dispersion, depending on the nomenclature adopted, approximately stoichiometrically equivalent quantities of two polymers, one of which is deacetylated N,N-dialkyl aminoalkoxy Xanthomonas hydrophilic colloid in which said alkyl and said alkoxy each have from one to five carbon atoms; and the other of which is a water dispersible polymeric hydrophilic colloid which contain carboxyl groups or generally anionic groups.

The aforesaid Xanthomonas colloid derivative has an equivalent weight as a cation which is derived from the presence of the amino groups therein; while the other hydrophilic colloid just recited likewise has an equivalent weight as an anionic colloid by virtue of the carboxyl groups. It is therefore an easy matter for anyone skilled in the art to determine the acid combining equivalent of the Xanthomonas colloid derivative and also the base combining equivalent of the hydrophilic colloid containing the carboxyl groups, and hence to compute stoichiometric equivalents an any given case. The stoichiometric equivalence need not be exact, but, as stated, merely substantial, and in this conection I have found that a variation of about plus or minus 10% from exact equivalence will yield useful products within the purview of the invention and this is what I mean by "substantially stoichiometrically equivalent quantities" as used throughout this specification and in the claims which follow.

As the cationic Xanthomonas colloid derivative, I prefer and find best (N,N-diethyl)aminoethyl Xanthomonas hydrophilic colloid. However, almost equally good are any of the homologues in accordance with the recitation given hereinabove and in the claims which follow, namely wherein any of the three ethyls in the preferred compound just named are replaced by corresponding alkyl chains having from one to five carbon atoms each.

The cationic Xanthomonas colloid derivatives recited herein and which I use in carrying out my invention form the subject matter of my copending application Ser. No. 315,689, filed Oct. 11, 1963, now Patent No. 3,244,695, which is incorporated herein by reference. This aforesaid copending application contains full directions for making the cationic Xanthomonas colloid derivatives used herein.

The water dispersible polymeric hydrophilic colloid which contain carboxyl groups or generally anionic groups may be chosen from a large number of available polymers corresponding to this definition, both natural and synthetic. I prefer and find best alginic acid, but I may also use pectic acid, polyacrylic acid, cellulose glycollic acid, starch glycollic acid, and others which will readily occur to those skilled in the art, and in particular to colloid chemists. All of the compounds just named are polymers in which the structural unit contains carboxyl groups or generally anionic groups.

It will be appreciated by those skilled in the art that the polymeric hydrophilic colloids containing the carboxyl groups exhibit their water dispersibility to best advantage when the said carboxyl groups are neutralized to salt form with a simple alkali metal ion such as sodium ion or lithium ion. These colloids in their fully acidified form are often relatively indispersible in water. This explanation is given here as a practical guide to choosing useful colloids corresponding to the recitation thereof in the claims which follow. (In quite the same way, the cationic Xanthomonas colloid derivative has enhanced water dispersibility if it in turn is neutralized by a simple acid, such as acetic acid or hydrochloric acid.)

Most generally, I prefer to make separate dispersions in water of the cationic Xanthomonas colloid derivative, in its unneutralized form, and of the carboxylic hydrophilic colloid, likewise in its unneutralized, viz. acidic form. These solution are then brought together with suitable agitation, to form the products in accordance with the invention.

Alternatively, if desired, each colloid can be preneutralized, the cationic Xanthomonas colloid derivative with a simple acid such as hydrochloric, and the carboxylic hydrophilic polymer with a simple base such as sodium hydroxide, and solutions of these two neutralized colloids then brought together as already described. The novel product of the invention will still form in this case, but the aqueous solution thereof will contain the reaction product of the simple acid and simple base, which in the example just given is sodium chloride. If the latter is undesirable it can readily be removed from the solution by dialysis.

No matter which of the above procedures is followed, the reaction product can be readily separated from its aqueous solution by precipitation with methanol, ethanol, or other like organic solvents which are themselves miscible with water. In many instances, this is a more convenient and less costly method of obtaining the product in dry form than by evaporating the whole aqueous solution.

Some examples of procedures in accordance with the invention follow:

EXAMPLE I (a) (N,N-diethyl)aminoethyl Xanthomonas hydrophilic colloid (1.96% nitrogen, corresponding to a D.S. of 0.2–0.25) was suspended in water using a Waring Blendor and then the calculated amount of alginic acid (swollen in water), which is about one-fifth of the weight of the cationic material, was added. After the mixture became homogeneous it was poured slowly into methanol with vigorous stirring. The precipitate was hardened in fresh methanol, filtered off, dried, and milled. The viscosity of a 1% aqueous solution was 1600 cps. and was highly thixotropic. The viscosity of the starting materials in this and in all following examples varied between 15 and 40 cps. at 1% concentration in water.

(b) (N,N-diethyl)aminoethyl Xanthomonas hydrophilic colloid with 2.2% nitrogen was neutralized with alginic acid as described above. After isolation of the reaction product the viscosity of a 1% solution was 590 cps.

(c) The example above was repeated but (N,N-diethyl)aminoethyl xanthan gum with 1.9% nitrogen was used. The viscosity of the end product was 1040 cps.

EXAMPLE II

In this example the same three cationic derivatives of xanthan gum were used. However, instead of the alginic acid, pectic acid was used for neutralization. Before the addition, the pectic acid was swollen in water by keeping at 50° for three hours. The three products obtained showed the following viscosities:

(a) 220 cps.
(b) 620 cps., highly thixotropic
(c) 650 cps.

EXAMPLE III (N,N-diethyl)aminoethyl Xanthomonas hydrophilic colloid (D.S. 0.2–0.25) was suspended in water and the calculated amount of (a) Polyacrylic acid and
(b) Cellulose glycollic acid (carboxymethyl cellulose (free acid))

was added. After mixing throughly in a Waring Blendor, the products were precipitated from methanol, washed with methanol, and dried. The viscosities of 1% aqueous solutions were:

(a) 550 cps., and
(b) 2320 cps. (highly thixotropic).

As will be seen from the examples given hereinabove, the resulting products in accordance with the invention are truly phenomenal because at a test concentration of 1% by weight in water, they give viscosities varying from 220 cps. to 2320 cps., whereas the starting materials individually, each at the same test concentration of 1%, gave viscosities which were quite low, namely, between 15 and 40 cps. This is a surprising and most unexpected result.

The products made in accordance with the invention are useful for many industrial and commercial applications. They may be used as the suspending colloid in water base paints; as suspending agents for enamel frits; for the preparation of poster colors and water colors; and indeed for most of the diverse uses to which water swellable hydrophilic colloids having greatly enhanced viscosities are used.

While I have described my invention with the aid of various specific examples, it will be apparent that many variations of detail, including different starting materials, reaction conditions, proportions, and the like may be employed without departing from the scope of my invention, as defined by the claims which follow.

What I claim is:

1. The process of forming a novel composition of matter which comprises bringing together in aqueous suspension substantially stoichiometrically equivalent quantities of deacetylated N,N-dialkyl aminoalkoxy Xanthomonas hydrophilic colloid in which said alkyl and said alkoxy groups each have from one to five carbon atoms, and a water dispersible polymeric hydrophilic colloid which contains carboxyl groups, said water dispersible colloid being selected from the group consisting of alginic acid, pectic acid, polyacrylic acid, cellulose glycollic acid, and starch glycollic acid.

2. The product obtained in accordance with the process of claim 1.

3. The process of forming a novel composition of matter which comprises bringing together in aqueous suspension substantially stoichiometrically equivalent quantities of deacetylated N,N-dialkyl aminoalkoxy Xanthomonas hydrophilic colloid in which said alkyl and said alkoxy groups each have from one to five carbon atoms, and alginic acid.

4. The process in accordance with claim 3 wherein said alkyl group is ethyl.

5. The product obtained in accordance with the process of claim 3.

6. The product obtained in accordance with the process of claim 4.

References Cited
UNITED STATES PATENTS

| | | | |
|---|---|---|---|
| 2,688,598 | 9/1954 | McNeely | 260—209.6 XR |
| 2,970,140 | 1/1961 | Hullinzer et al. | 260—233.3 |
| 3,163,602 | 12/1964 | Lindblom et al. | 252—8.55 |
| 3,244,695 | 4/1966 | Scheiger | 260—209 |

LEON D. ROSDOL, *Primary Examiner.*

H. B. GUYNN, *Assistant Examiner.*